United States Patent [19]

Cohen et al.

[11] 4,414,278

[45] Nov. 8, 1983

[54] CROSSLINKED TRIACRYLATE POLYMER BEADS

[75] Inventors: Abraham B. Cohen, Springfield, N.J.; Christina N. Lazaridis, Wilmington, Del.

[73] Assignee: E. I. Du Pont de Nemours and Company, Wilmington, Del.

[21] Appl. No.: 370,992

[22] Filed: Apr. 22, 1982

[51] Int. Cl.$^3$ .............................................. B32B 5/16
[52] U.S. Cl. ................................ 428/402; 526/323.1; 526/323.2
[58] Field of Search ..................... 428/402; 526/323.1, 526/323.2

[56] References Cited

U.S. PATENT DOCUMENTS 2,701,245  2/1955  Lynn ................................... 260/89.5
3,313,748  4/1967  Burke, Jr. ................................ 260/4
4,191,672  3/1980  Salome et al. ............... 260/29.6 PM
4,277,536  7/1981  Podszun et al. ..................... 428/402

Primary Examiner—Marion McCamish
Assistant Examiner—Beverly K. Johnson

[57] ABSTRACT

Discrete, substantially nonswellable crosslinked polymeric beads, 0.7 to 20 μm average diameter wherein at least 90% of the beads by population are below 20 μm, which are nonagglomerating in any solvent or solvents including solvents for the liquid monomer or monomers used in preparation thereof. The polymeric beads are homopolymers of tri- and tetraacrylate and tri- and tetramethacrylate monomers, copolymers thereof, copolymers of one of said acrylate or methacrylate monomers with up to 50% of a monomer having a single terminal ethylenic group or with up to 75% of a monomer having two terminal ethylenic groups or three terminal ethylenic groups different from said triacrylate or trimethacrylate monomers defined above.

10 Claims, No Drawings

CROSSLINKED TRIACRYLATE POLYMER BEADS

DESCRIPTION

1. Technical Field

This invention relates to crosslinked polymer beads. More particularly this invention relates to crosslinked polymer beads derived from triacrylate and tetraacrylate monomers.

2. Background Art

The formation of polymer beads of various sizes is known. U.S. Pat. No. 2,701,245, for example, describes a process for the production of small beads in the size range of 1 to 20 μm. Such beads can be prepared utilizing monomers of methyl methacrylate, vinyl pyridine or styrene. The polymeric beads are recovered as individual particles from an aqueous surfactant solution, rather than as clumps of beads or agglomerates, and are said to be more spherical than the beads obtained by prior art methods. However, since the polymeric beads prepared by the prior art process are not substantially crosslinked, they swell and/or agglomerate in many organic solvents.

The object of this invention is to provide discrete crosslinked polymer beads which will not agglomerate or swell in any solvent or solvents including solvents for the monomer or monomers used in the preparation of the beads.

DISCLOSURE OF INVENTION

In accordance with this invention there is provided discrete, substantially nonswellable, crosslinked polymeric beads having an average diameter size in the range of 0.7 to 20 μm, wherein at least 90% of the beads by population are below 20 μm, the beads being nonagglomerating in any solvent or solvents including a solvent or solvents for the monomer or monomers used in the preparation of the polymeric beads which are taken from the class consisting of homopolymers of tri- and tetraacrylate and tri- and tetramethacrylate monomers, copolymers of said tri- and tetraacrylate and tri- and tetramethacrylate monomers, copolymers of one of said tri- and tetraacrylate or said tri- and tetramethacrylate monomers and up to 50% by weight of at least one monomer having one terminal ethylenic group, copolymers of one of said tri- and tetraacrylate or said tri- and tetramethacrylate monomers and up to 75% by weight of at least one monomer having two terminal ethylenic groups or three terminal ethylenic groups different from said triacrylate or trimethacrylate monomers.

The polymeric beads of this invention include homopolymers and copolymers of triacrylate and tetraacrylate monomers more fully described below. They are obtained in a size range of about 0.7 to 20 μm by a suspension polymerization process modified from the process described in U.S. Pat. No. 2,701,245. The size of the beads which are spherical can be readily measured by standard electron microscopes. A particularly useful instrument for measuring the distribution of polymeric beads after preparation thereof is a Coulter Counter ® manufactured by Coulter Electronics, Inc., Hialeah, Florida. As shown in the examples, the Coulter Counter ® determines the percentage of beads based on population as well as percentages of beads based on volume.

The polymeric beads obtained are crosslinked within the particles so that they are nonswellable and nonsoluble in solvents for noncrosslinked polymer material. The solvent used should not degrade or substantially alter the polymeric structure of the beads. Useful solvents include typical organic solvents, water, basic aqueous solutions, etc. By "crosslinked" is meant a three-dimensional polymer network which is held together indissolubly by primary valence linkages and which therefore is nonsoluble in solvents. The beads do not dissolve or swell in the materials with which they are combined and thus they remain as discrete particles in spherical form. A swelling test is more fully described below. The beads therefore are nonagglomerating in any solvent or solvents including solvents for the monomer or monomers used in their preparation.

Of the numerous monomers tested, it is found that the tri- and tetraacrylate and tri- and tetramethacrylate monomers per se or in combination with monomers having one, two or three terminal ethylenic groups as defined above produce discrete, substantially crosslinked polymeric beads. As the amount of tri- and tetraacrylate or tri- and tetramethacrylate monomer present is decreased, the percentage of swelling increases. Other useful polymeric beads may be determined by testing beads manufactured according to the suspension polymerization process in the Swelling Test described below. Among the useful polymeric beads are homopolymers of trimethylolpropane triacrylate, trimethylolpropane trimethacrylate, pentaerythritol triacrylate, glycerol triacrylate, polyoxypropyltrimethylolpropane triacrylate, polyoxyethyltrimethylolpropane triacrylate, pentaerythritol tetraacrylate, pentaerythritol tetramethacrylate; copolymers of the aforementioned monomers with each other; copolymers of said tri- and tetraacrylate or tri- and tetramethacrylate monomers and up to 50% by weight, preferably 25% by weight, of at least one monomer having a single terminal ethylenic group, e.g., the alkyl acrylates and methacrylates; benzyl acrylate and methacrylate, N,N-dimethylaminoethyl acrylate and methacrylate, N,N'-diethylaminoethyl acrylate and methacrylate, ethylene glycol acrylate phthalate, ethylene glycol methacrylate phthalate, etc.; copolymers of said tri- and tetraacrylate or tri- and tetramethacrylate monomers and up to 75% by weight, preferably 50% by weight, of at least one liquid monomer having two terminal ethylenic groups, e.g., triethylene glycol diacrylate and triethylene glycol dimethacrylate, ethylene glycol diacrylate and ethylene glycol dimethacrylate, diethylene glycol diacrylate and diethylene glycol dimethacrylate, glycerol diacrylate and glycerol dimethacrylate, 1,3-butanediol diacrylate and 1,3-butanediol dimethacrylate, 1,4-cyclohexanediol diacrylate and 1,4-cyclohexanediol dimethacrylate, 1,4-benzenediol acrylate and 1,4-benzenediol dimethacrylate, 1,2-benzenedimethanol diacrylate and 1,2-benzenedimethanol dimethacrylate, 1,3-propanediol diacrylate and 1,3-propanediol dimethacrylate, 1,3-pentanediol diacrylate and 1,3-pentanediol dimethacrylate, 1,4-butanediol diacrylate and 1,4-butanediol dimethacrylate, hexamethylene glycol diacrylate and hexamethylene glycol dimethacrylate, decamethylene glycol diacrylate and decamethylene glycol dimethacrylate, 2,2-dimethylolpropane diacrylate and 2,2-dimethylolpropane dimethacrylate, tripropylene glycol diacrylate and tripropylene glycol dimethacrylate, 2,2-di(p-hydroxyphenyl)propane diacrylate and 2,2-di(p-hydroxyphenyl)propane dimethacrylate, polyoxyethyl-2,2-di(p-hydroxyphenyl)propane diacrylate and polyoxyethyl-2,2-di(p-hydroxyphenyl)propane dimethacrylate, 2,2,4-trimethyl-1,3-pentanediol diacrylate and 2,2,4-trimethyl-1,3-pentanediol dimethacrylate, 1-phenylethylene glycol diacrylate and 1-phenylethylene glycol dimethacrylate, tetraethylene glycol diacrylate and tetraethylene glycol dimethacrylate, and ethylenically unsaturated diester polyhydroxy polyethers of the formula:

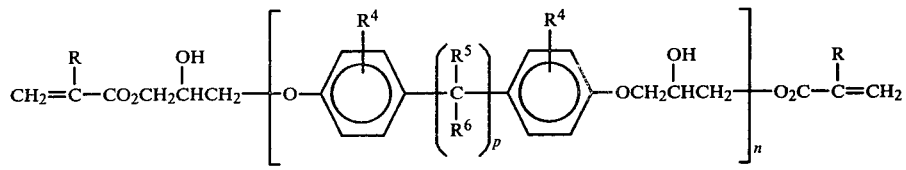

wherein R is hydrogen or methyl, $R^4$ is hydrogen or an alkyl of 1 to 4 carbon atoms, $R^5$ is hydrogen or methyl, $R^6$ is hydrogen, methyl or ethyl, n is 0 to 4, and p is 0 or 1, respectively. Preferably $R^4$ is H, $R^5$ and $R^6$ are $CH_3$, n is 1–4 and p is 1; or copolymers of said tri- and tetraacrylate or tri- and tetramethacrylate monomers and up to 50% by weight of at least one monomer having three terminal ethylenic groups different from the triacrylate and trimethacrylate monomers described above. Polymeric beads of terpolymers of the said tri- and tetraacrylates are also useful. Liquid monomers are preferred in preparing the crosslinked polymeric beads. Solid monomers or comonomers can be used by forming a two phase liquid dispersion wherein a solvent for the monomers or comonomers is present together with an aqueous surfactant solution (Phase II) wherein the monomers or comonomers are insoluble. The homopolymer of trimethylolpropane triacrylate has been found to be particularly preferred in photopolymerizable elements as described below.

BEST MODE FOR CARRYING OUT THE INVENTION

The best mode is illustrated in Example 1 wherein the polymeric beads are prepared using trimethylolpropane triacrylate as the sole monomer.

INDUSTRIAL APPLICABILITY

The discrete polymeric beads of this invention are useful as fillers in a variety of compositions including organic polymer-containing compositions which may or may not be photopolymerizable. The polymeric beads are smooth-surfaced, spherical particles. They generally are colorless and may be colored by incorporating dyes or pigments in the composition during the preparation of the beads. The presence of the polymeric beads in the polymer compositions may provide a matte finish depending on the bead size, bead concentration and layer coating thickness. The beads are also useful in the outer layers of photosensitive elements. The polymeric beads are particularly useful when they are present in a photohardenable layer of a photohardenable element comprising a support bearing, in order, at least one photohardenable layer, and a nonphotosensitive liquid developable layer, the photohardenable layer present beneath the nonphotosensitive layer having confined therein said polymeric beads, at least some of which protrude into the nonphotosensitive layer to cause protuberances in the surface of the nonphotosensitive layer. Photopolymerizable elements containing the discrete polymeric beads of this invention are described in Neiss and Woodruff U.S. application Ser. No. 370,993, filed concurrently herewith entitled "Overcoated Photohardenable Element Having Surface Protuberances".

EXAMPLES

The following examples illustrate the invention wherein the parts and percentages are by weight. The polymeric molecular weights are expressed as number average molecular weights (Mn) except where stated. The Mn for the polymers described herein can be determined by gel permeation chromatography employing a polybutadiene standard or other standard known to those skilled in the art. The number average molecular weights for the polymeric beads is not determinable since they do not dissolve in any solvent.

The polymeric beads set forth in the examples are tested for swelling by the following procedure.

SWELLING TEST

A one gram sample of polymeric beads is placed into a graduated 25 ml centrifuge tube, and the tube is filled to the 10 ml mark with methylene chloride. The contents in the tube is mixed thoroughly, the tube is centrifuged, and then the tube is sealed with a screw cap. The volume of the polymer column is recorded. The sealed tube is maintained at ambient conditions for one week and then recentrifuged. The volume of the polymer column is remeasured and compared with the initial volume of the polymer column. Any degree of swelling is undesirable for purposes of this invention.

In Examples 2 to 11, the asterisk in each Table denotes that the smallest channel of the Coulter Counter is blocked during the measurements to reduce the noise level.

EXAMPLE 1

Into a one quart (~0.95 liter) glass jar are added trimethylolpropane triacrylate monomer (TMPTA), Ware Chemical Co., Stratford, CT, having a molecular weight of 296 (500 g inhibited with 193.1 ppm of hydroquinone and 129.8 ppm of methoxyhydroquinone and 5.7 g (1.14% based on monomer) of benzoyl peroxide, Aldrich Company, Milwaukee, Wisconsin. The mixture is stirred with a magnetic stirring bar until the benzoyl peroxide is dissolved, Into a two liter stainless steel beaker are added 1196 ml distilled water, 2.5 g (0.5% based on monomer) of sodium bis-(2-ethylhexyl)sulfosuccinate, American Cyanamid Co., Wayne, New Jersey, and 4.2 g (0.5% active ingredient based on monomer) of the sodium salt of oleoyl methyl tauride, American Hoechst Corp., Somerville, New Jersey, and the mixture is stirred with a magnetic stirring bar until the components are in solution. The stirring bars are removed, the monomer solution is added to the stainless steel beaker, and the mixture is homogenized using a ½ HP Greerco Homogenizer Mixer, Model IL, manufactured by Greerco Corp., Hudson, New Hampshire, for 6 minutes at 65% of full scale using a Powerstat ® Variable Transformer. The emulsion is then put into a ½ gallon (1.89 liters) polyethylene bottle and is placed in a constant temperature bath at 65°-70° C. with no additional stirring for at least 2 to 3 days. During this time most of the product settles out into a hard cake at the bottom of the container. The milky supernatant, containing mostly colloidal particles, is decanted, an equivalent amount of distilled water is added and the beads are resuspended and washed by putting the mixture on a roll mill for about one hour. The product is recovered by filtering through Whatman #54 filter paper in a large (11 inches (27.94 cm) diameter) Buchner funnel. After air drying overnight, the product is vacuum dried at 90° C. for 16 hours. The yield generally is between 80 and 90%. Coulter Counter ® size measurements on dry beads indicate a median bead diameter of 1.5 μm (based on population) and 3.7 μm (based on volume). The beads exhibit no swelling when tested as described above. The size distribution of the beads is shown in Table 1.

TABLE 1

| Average Channel Diameter, μm | % Based On Population | % Based On Volume |
| --- | --- | --- |
| 0.71 | 18.993 | 0.5 |
| 0.90 | 12.729 | 0.7 |
| 1.13 | 14.617 | 1.7 |
| 1.42 | 13.417 | 3.1 |
| 1.80 | 13.522 | 6.2 |
| 2.26 | 10.726 | 10.6 |
| 2.84 | 7.678 | 14.8 |
| 3.58 | 4.274 | 15.7 |
| 4.52 | 2.510 | 17.4 |
| 5.70 | 1.129 | 16.2 |
| 7.18 | 0.338 | 9.7 |
| 9.04 | 0.062 | 3.2 |
| 11.39 | 0.005 | 0.4 |
| 14.35 | 0.000 | 0.0 |
| 18.10 | 0.000 | 0.0 |
| 22.80 | 0.000 | 0.0 |

A photopolymerizable composition is prepared from the following ingredients:

| Ingredient | Weight (g) |
| --- | --- |
| Methylene chloride | 142,244.0 |
| 2-Ethoxy ethanol | 12,429.0 |
| Trimethylolpropane triacrylate | 5,047.0 |
| Tetraethylene glycol dimethacrylate | 5,047.0 |
| Copolymer of styrene/maleic anhydride (1.4/1) Mol. Wt., ca. 10,000 | 20,415.0 |
| Titanium acetyl acetonate, 75% in isopropanol | 1,227.0 |
| Ethyl tetrahydroquinoline chromanone | 333.64 |
| 1-(2'-Nitro-4',5'-dimethoxy)phenyl-1-(4-t-butyl-phenoxy)ethane | 3,017.6 |
| Bis(2-o-chlorophenyl-4,5-bis(3'-methoxyphenyl)imidazole | 1,676,0 |
| Bis(2-o-chlorophenyl-4,5-bis-phenyl)imidazole | 1,675.0 |
| 1,4,4-trimethyl-2,3-diazabicyclo[3.2.2]-non-2-ene-N,N'—dioxide | 34.25 |
| Milled dispersion of | |
| (a) Sterling ® carbon 45 parts black | 13,488.0 |
| (b) 75% of terpolymer: ethyl acrylate (56.0), methyl methacrylate (37.0), acrylic (7.0) Acid No. 76-85; weight ave. Mol wt. ca. 260,000, and 25% of a copolymer of styrene/maleic anhydride (1.4/1) Mol. 55 parts | 16,464.0 |

| Ingredient | Weight (g) |
| --- | --- |
| -continued | |
| Wt. ca. 10,000 | |

This composition is thoroughly mixed, and is then machine coated on the resin subbed side of a 0.004 inch (0.01 cm) polyethylene terephthalate film support as 124 ft/min (37.7 m/min). The coating is dried at 170° F. (76.7° C.) to yield a black photopolymer layer with a coating weight of 50 mg/dm² (5 μm in thickness).

A second photopolymer composition is prepared by emulsifying the following Solutions A and B in a Gaulin Homogenizer at 3000 psi (210.6 kg/sq cm) (1 stage). Solution A is prepared by thoroughly mixing the following ingredients:

| Ingredient | Weight (g) |
| --- | --- |
| Tetraethylene glycol dimethylacrylate | 1872.0 |
| Trimethylolpropane triacrylate | 1874.0 |
| Ethyl tetrahydroquinoline chromanone | 125.0 |
| 1-(2'-Nitro-4',5'-dimethoxy)phenyl-1-(4-t-butyl-phenoxy)ethane | 1125.0 |
| Bis(2-o-chlorophenyl-4,5-bis(3'-methoxyphenyl)imidazole | 624.0 |
| Bis(2-o-chlorophenyl-4,5-bis-phenyl)imidazole | 624.0 |
| 1,4,4-trimethyl-2,3-diazabicyclo[3.2.2]-non-2-ene-N,N'—dioxide | 12.2 |
| Methylene chloride | 9072.0 |

Solution B is prepared by thoroughly mixing the following ingredients:

| Ingredient | Weight (g) |
| --- | --- |
| Acrysol ® I-98 (acrylic copolymer supplied as a latex, Rohm & Haas, Co., Philadelphia, Pa.) | 22,228.0 |
| Rhoplex ® B-505 (acrylic latex emulsion, Rohm & Hass Co., Philadelphia, Pa.) | 16,648.0 |
| 40% Dispersion of submicron poly (ethylene) particles in water | 12,474.0 |
| Triton ® X-100, 10% solution (octyl-phenoxy polyethoxy ethanol, dispersing agent, Rohm & Hass Co.) | 3,742.0 |
| Ammonium hydroxide | 450.0 |
| Distilled water | 82,330.0 |

The second photopolymer composition is stirred for 15 minutes, 1,905 g of trimethylolpropane triacrylate beads (12.5 g/1000 g/solution) having a particle median diameter of 1.5 μm (population) and 3.7 μm (volume) as described above and specific gravity of about 1.3 are added, and the photopolymer composition is milled in a Kady Mill for 5 minutes, followed by the addition of 2338 g of 5% "FC-128", anionic fluorocarbon surfactant from 3M Co. (15 g/1000 g solution) and 16,955 g of water. The polymer particle-containing photopolymer composition is stirred for more than 30 minutes.

The stirred composition is coated contiguous to the first photopolymerizable layer at 30 ft/min (914.4 m/min). The resulting layer with a coating weight of ca. 40 mg/dm² (about 4.0 μm in thickness is dried at 220° F. (104° C.).

An overcoat composition (16.8% solids) is prepared as follows:

| Ingredient | Weight (g) |
| --- | --- |
| Distilled water | 371.498.0 |
| Poly(vinyl alcohol) 13% solution | 146,388.0 |
| Polyvinylpyrollidone(70)/vinyl acetate(30) copolymer | 10,485.0 |
| "FC-128" (anionic fluorocarbon surfactant from 3M Co.) | 844.0 |

The composition is thoroughly mixed and is coated over the dry, clear photopolymerizable layer at 40 ft/min (12.19 m/min). The resulting layer is dried at 220° F. (104° C.). The layer thickness is about 1.3 μm.

The photopolymer element is exposed for 20 seconds to a 4KW xenon arc light source manufactured by Mac-Beth Arc Light Co., Philadelphia, PA at a distance of 60 inches (152.4 cm) through a photographic positive image in contact with the overcoating layer. The positive image is removed, and the element is reexposed for 60 seconds to the same light source through a cut-off filter which absorbs all the light below 400 nm. The film is then processed through an automatic processor described in U.S. Pat. No. 4,142,194, at 5 feet/minute (152.4 cm/minute) developed at 85° F. (29.4° C.) and rinsed at 100° F. (37.8° C.) to produce an exact duplicate of the original positive image. The element exhibits excellent drawdown in the exposure vacuum frame within 30 seconds and the surface is nontacky.

EXAMPLES 2 TO 5

Example 1 is repeated using the monomers indicated below.

EXAMPLE 2

Trimethylolpropane Trimethacrylate, 500 g

The size distribution of the beads is shown in Table 2.

TABLE 2

| Average Channel Diameter, μm | % Based on Population | % Based on Volume |
| --- | --- | --- |
| 0.71* | 0.000 | 0.0 |
| 0.90 | 38.895 | 8.7 |
| 1.13 | 24.983 | 11.7 |
| 1.42 | 16.626 | 14.7 |
| 1.80 | 11.543 | 19.8 |
| 2.26 | 5.539 | 19.7 |
| 2.84 | 1.924 | 13.0 |
| 3.58 | 0.398 | 5.5 |
| 4.52 | 0.066 | 1.5 |
| 5.70 | 0.017 | 0.8 |
| 7.18 | 0.004 | 0.3 |
| 9.04 | 0.001 | 0.0 |
| 11.39 | 0.001 | 0.4 |
| 14.35 | 0.006 | 2.0 |
| 18.10 | 0.000 | 0.0 |
| 22.80 | 0.001 | 3.0 |
| median bead = | 1.16 μm | 2.00 μm |

EXAMPLE 3

|  | Trimethylolpropane Triacrylate | Methyl Methacrylate |
| --- | --- | --- |
| 1. | 490 g (98) | 10 g (2) |
| 2. | 475 g (95) | 25 g (5) |
| 3. | 450 g (90) | 50 g (10) |
| 4. | 375 g (75) | 125 g (25) |

The size distributions of the beads of samples 1 to 4 are shown in Tables 3 to 6, respectively.

TABLE 3

| Average Channel Diameter, μm | % Based on Population | % Based on Volume |
| --- | --- | --- |
| 0.71* | 0.000 | 0.0 |
| 0.90 | 19.335 | 1.4 |
| 1.13 | 20.348 | 3.4 |
| 1.42 | 20.866 | 6.6 |
| 1.80 | 17.182 | 10.7 |
| 2.26 | 10.649 | 13.9 |
| 2.84 | 6.126 | 15.5 |
| 3.58 | 3.151 | 15.7 |
| 4.52 | 1.601 | 15.4 |
| 5.70 | 0.611 | 12.3 |
| 7.18 | 0.118 | 4.4 |
| 9.04 | 0.011 | 0.6 |
| 11.39 | 0.000 | 0.0 |
| 14.35 | 0.001 | 0.0 |
| 18.10 | 0.001 | 0.7 |
| 22.80 | 0.000 | 0.0 |
| median bead = | 1.18 μm | 2.62 μm |

TABLE 4

| Average Channel Diameter, μm | % Based on Population | % Based on Volume |
| --- | --- | --- |
| 0.71* | 0.000 | 0.0 |
| 0.90 | 16.769 | 1.0 |
| 1.13 | 17.376 | 2.4 |
| 1.42 | 20.725 | 5.7 |
| 1.80 | 19.189 | 10.3 |
| 2.26 | 11.689 | 13.2 |
| 2.84 | 7.145 | 15.7 |
| 3.58 | 4.008 | 17.3 |
| 4.52 | 2.196 | 18.4 |
| 5.70 | 0.800 | 13.7 |
| 7.18 | 0.101 | 3.0 |
| 9.04 | 0.002 | 0.0 |
| 11.39 | 0.000 | 0.0 |
| 14.35 | 0.000 | 0.0 |
| 18.10 | 0.000 | 0.0 |
| 22.80 | 0.000 | 0.0 |
| median bead = | 1.27 μm | 2.72 μm |

TABLE 5

| Average Channel Diameter, μm | % Based on Population | % Based on Volume |
| --- | --- | --- |
| 0.71* | 0.000 | 0.0 |
| 0.90 | 15.958 | 1.0 |
| 1.13 | 14.113 | 2.0 |
| 1.42 | 15.352 | 4.3 |
| 1.80 | 20.113 | 11.6 |
| 2.26 | 17.147 | 20.1 |
| 2.84 | 10.746 | 24.4 |
| 3.58 | 4.862 | 21.3 |
| 4.52 | 1.512 | 12.4 |
| 5.70 | 0.186 | 3.0 |
| 7.18 | 0.009 | 0.1 |
| 9.04 | 0.000 | 0.0 |
| 11.39 | 0.000 | 0.0 |
| 14.35 | 0.007 | 0.5 |
| 18.10 | 0.000 | 0.0 |
| 22.80 | 0.000 | 0.0 |
| median bead = | 1.38 μm | 2.29 μm |

TABLE 6

| Average Channel Diameter, μm | % Based on Population | % Based on Volume |
| --- | --- | --- |
| 0.71* | 0.000 | 0.0 |
| 0.90 | 53.429 | 42.2 |
| 1.13 | 21.584 | 21.6 |
| 1.42 | 14.429 | 18.1 |
| 1.80 | 8.429 | 13.3 |
| 2.26 | 1.634 | 3.3 |
| 2.84 | 0.278 | 0.7 |

TABLE 6-continued

| Average Channel Diameter, μm | % Based on Population | % Based on Volume |
|---|---|---|
| 3.58 | 0.120 | 0.4 |
| 4.52 | 0.060 | 0.2 |
| 5.70 | 0.024 | 0.1 |
| 7.18 | 0.009 | 0.0 |
| 9.04 | 0.003 | 0.0 |
| 11.39 | 0.001 | 0.0 |
| 14.35 | 0.001 | 0.0 |
| 18.10 | 0.000 | 0.0 |
| 22.80 | 0.001 | 0.0 |
| median bead = | 1.20 μm | 1.41 μm |

EXAMPLE 4

| | Trimethylolpropane Triacrylate | Triethyleneglycol Diacrylate |
|---|---|---|
| 1. | 450 g (90) | 50 g (10) |
| 2. | 375 g (75) | 125 g (25) |
| 3. | 250 g (50) | 250 g (50) |

The size distributions of the beads of samples 1 to 3 are shown in Tables 7 to 9, respectively.

TABLE 7

| Average Channel Diameter, μm | % Based on Population | % Based on Volume |
|---|---|---|
| 0.71* | 0.000 | 0.0 |
| 0.90 | 31.714 | 2.6 |
| 1.13 | 21.445 | 3.7 |
| 1.42 | 16.334 | 5.5 |
| 1.80 | 13.337 | 8.8 |
| 2.26 | 7.884 | 10.8 |
| 2.84 | 4.726 | 12.9 |
| 3.58 | 2.409 | 12.9 |
| 4.52 | 1.378 | 14.5 |
| 5.70 | 0.557 | 12.1 |
| 7.18 | 0.169 | 6.8 |
| 9.04 | 0.033 | 2.9 |
| 11.39 | 0.010 | 1.7 |
| 14.35 | 0.007 | 2.3 |
| 18.10 | 0.004 | 2.6 |
| 22.80 | 0.000 | 0.0 |
| median bead = | 1.22 μm | 3.61 μm |

TABLE 8

| Average Channel Diameter, μm | % Based on Population | % Based on Volume |
|---|---|---|
| 0.71* | 0.000 | 0.0 |
| 0.90 | 27.610 | 2.6 |
| 1.13 | 21.095 | 4.3 |
| 1.42 | 16.870 | 6.7 |
| 1.80 | 15.116 | 11.7 |
| 2.26 | 9.367 | 15.3 |
| 2.84 | 5.526 | 17.6 |
| 3.58 | 2.707 | 16.9 |
| 4.52 | 1.224 | 14.7 |
| 5.70 | 0.334 | 8.1 |
| 7.18 | 0.041 | 1.9 |
| 9.04 | 0.004 | 0.3 |
| 11.39 | 0.006 | 1.1 |
| 14.35 | 0.000 | 0.0 |
| 18.10 | 0.000 | 0.0 |
| 22.80 | 0.000 | 0.0 |
| median bead = | 1.52 μm | 2.82 μm |

TABLE 9

| Average Channel Diameter, μm | % Based on Population | % Based on Volume |
|---|---|---|
| 0.71* | 0.000 | 0.0 |
| 0.90 | 15.294 | 1.5 |

TABLE 9-continued

| Average Channel Diameter, μm | % Based on Population | % Based on Volume |
|---|---|---|
| 1.13 | 15.789 | 3.5 |
| 1.42 | 19.139 | 8.4 |
| 1.80 | 24.188 | 20.4 |
| 2.26 | 16.033 | 27.7 |
| 2.84 | 7.331 | 24.3 |
| 3.58 | 1.946 | 12.1 |
| 4.52 | 0.259 | 2.8 |
| 5.70 | 0.016 | 0.3 |
| 7.18 | 0.004 | 0.0 |
| 9.04 | 0.000 | 0.0 |
| 11.39 | 0.001 | 0.1 |
| 14.35 | 0.000 | 0.0 |
| 18.10 | 0.000 | 0.0 |
| 22.80 | 0.000 | 0.0 |
| median bead = | 1.62 μm | 2.40 μm |

EXAMPLE 5

| | Trimethylolpropane Triacrylate | Pentaerythritol Triacrylate |
|---|---|---|
| 1. | 450 g (90) | 50 g (10) |
| 2. | 375 g (75) | 125 g (25) |
| 3. | 250 g (50) | 250 g (50) |

The size distribution of the beads of samples 1 to 3 are shown in Tables 10 to 12, respectively.

TABLE 10

| Average Channel Diameter, μm | % Based on Population | % Based on Volume |
|---|---|---|
| 0.71* | 0.000 | 0.0 |
| 0.90 | 37.986 | 9.5 |
| 1.13 | 26.197 | 13.4 |
| 1.42 | 19.882 | 19.4 |
| 1.80 | 11.907 | 21.4 |
| 2.26 | 3.092 | 11.3 |
| 2.84 | 0.642 | 4.5 |
| 3.58 | 0.170 | 2.3 |
| 4.52 | 0.070 | 1.8 |
| 5.70 | 0.031 | 1.8 |
| 7.18 | 0.010 | 1.5 |
| 9.04 | 0.006 | 1.4 |
| 11.39 | 0.001 | 0.5 |
| 14.35 | 0.003 | 2.9 |
| 18.10 | 0.001 | 1.7 |
| 22.80 | 0.002 | 8.0 |
| median bead = | 1.12 μm | 1.79 μm |

TABLE 11

| Average Channel Diameter, μm | % Based on Population | % Based on Volume |
|---|---|---|
| 0.71* | 0.000 | 0.0 |
| 0.90 | 29.507 | 1.1 |
| 1.13 | 18.771 | 1.6 |
| 1.42 | 16.051 | 2.8 |
| 1.80 | 13.924 | 4.7 |
| 2.26 | 8.894 | 6.5 |
| 2.84 | 5.609 | 8.0 |
| 3.58 | 3.137 | 8.8 |
| 4.52 | 1.935 | 10.9 |
| 5.70 | 1.213 | 14.1 |
| 7.18 | 0.639 | 15.0 |
| 9.04 | 0.220 | 10.3 |
| 11.39 | 0.061 | 5.3 |
| 14.35 | 0.028 | 5.3 |
| 18.10 | 0.010 | 3.8 |
| 22.80 | 0.006 | 1.1 |
| median bead = | 1.64 μm | 5.50 μm |

TABLE 12

| Average Channel Diameter, μm | % Based on Population | % Based on Volume |
| --- | --- | --- |
| 0.71* | 0.000 | 0.0 |
| 0.90 | 17.609 | 0.0 |
| 1.13 | 12.123 | 0.0 |
| 1.42 | 12.568 | 0.5 |
| 1.80 | 13.714 | 1.6 |
| 2.26 | 12.250 | 2.5 |
| 2.84 | 10.306 | 4.2 |
| 3.58 | 7.681 | 6.5 |
| 4.52 | 5.566 | 8.9 |
| 5.70 | 3.816 | 12.9 |
| 7.18 | 2.317 | 15.7 |
| 9.04 | 1.204 | 16.1 |
| 11.39 | 0.593 | 15.0 |
| 14.35 | 0.209 | 10.5 |
| 18.10 | 0.034 | 3.3 |
| 22.80 | 0.009 | 1.7 |
| median bead = | 1.83 μm | 7.88 μm |

The beads prepared as described in Examples 2 to 5 exhibit no swelling when tested as described above.

EXAMPLE 6

Example 1 is repeated, using as the initiator 3.9 g of 2,2'-azobis(isobutyronitrile), 0.78% based on monomer. The size distribution of the beads is shown in Table 13.

TABLE 13

| Average Channel Diameter, μm | % Based on Population | % Based on Volume |
| --- | --- | --- |
| 0.71* | 0.000 | 0.0 |
| 0.90 | 31.427 | 2.7 |
| 1.13 | 19.834 | 3.6 |
| 1.42 | 15.873 | 5.6 |
| 1.80 | 13.813 | 9.5 |
| 2.26 | 8.888 | 12.9 |
| 2.84 | 5.281 | 15.0 |
| 3.58 | 2.769 | 15.3 |
| 4.52 | 1.372 | 15.0 |
| 5.70 | 0.582 | 13.3 |
| 7.18 | 0.148 | 6.4 |
| 9.04 | 0.007 | 0.5 |
| 11.39 | 0.004 | 0.7 |
| 14.35 | 0.006 | 0.5 |
| 18.10 | 0.000 | 0.0 |
| 22.80 | 0.000 | 0.0 |
| median bead = | 1.57 μm | 3.34 μm |

EXAMPLE 7

The procedure of Example 1 is repeated except that all ingredients are multiplied eight-fold, and the homogenization time is increased to 60 minutes (in a five gallon (18.9 liter) stainless steel kettle). The kettle is covered and set in a constant temperature bath at 60°-65° C. for three days. The beads are allowed to settle an additional three to four days at room temperature, then recovered according to the procedure of Example 1 (using a mechanical stirrer to redisperse the beads, rather than a roll mill). The size distribution of the beads is shown in Table 14.

TABLE 14

| Average Channel Diameter, μm | % Based on Population | % Based on Volume |
| --- | --- | --- |
| 0.71* | 0.000 | 0.0 |
| 0.90 | 18.427 | 0.5 |
| 1.13 | 15.901 | 1.1 |
| 1.42 | 15.811 | 2.3 |
| 1.80 | 16.234 | 4.8 |
| 2.26 | 12.433 | 7.9 |
| 2.84 | 9.096 | 11.3 |
| 3.58 | 5.513 | 13.3 |
| 4.52 | 3.503 | 16.8 |
| 5.70 | 2.067 | 20.4 |
| 7.18 | 0.906 | 17.5 |
| 9.04 | 0.106 | 3.7 |
| 11.39 | 0.003 | 0.0 |
| 14.35 | 0.000 | 0.0 |
| 18.10 | 0.000 | 0.0 |
| 22.80 | 0.000 | 0.0 |
| median bead = | 1.61 μm | 4.52 μm |

EXAMPLE 8

The procedure of Example 7 is repeated except that the monomer contains 7.0 ppm of hydroquinone and 79.0 ppm of methoxyhydroquinone. The size distribution of the beads is shown in Table 15.

TABLE 15

| Average Channel Diameter, μm | % Based on Population | % Based on Volume |
| --- | --- | --- |
| 0.71* | 0.000 | 0.0 |
| 0.90 | 24.963 | 1.2 |
| 1.13 | 19.593 | 2.1 |
| 1.42 | 16.680 | 3.5 |
| 1.80 | 14.105 | 5.8 |
| 2.26 | 9.672 | 8.6 |
| 2.84 | 6.557 | 11.3 |
| 3.58 | 4.024 | 13.7 |
| 4.52 | 2.451 | 16.4 |
| 5.70 | 1.357 | 19.0 |
| 7.18 | 0.504 | 13.5 |
| 9.04 | 0.084 | 4.4 |
| 11.39 | 0.006 | 0.4 |
| 14.35 | 0.001 | 0.0 |
| 18.10 | 0.000 | 0.0 |
| 22.80 | 0.000 | 0.0 |
| median bead = | 1.55 μm | 4.25 μm |

EXAMPLE 9

The procedure of Example 8 is repeated except that the monomer mixture is homogenized at 85% of full scale using a Powerstat ® Variable Transformer. The size distribution of the beads is shown in Table 16.

TABLE 16

| Average Channel Diameter, μm | % Based on Population | % Based on Volume |
| --- | --- | --- |
| 0.71* | 0.000 | 0.0 |
| 0.90 | 21.449 | 1.6 |
| 1.13 | 15.808 | 2.6 |
| 1.42 | 15.057 | 4.9 |
| 1.80 | 16.831 | 10.9 |
| 2.26 | 15.158 | 20.4 |
| 2.84 | 9.977 | 25.9 |
| 3.58 | 4.405 | 21.8 |
| 4.52 | 1.219 | 11.3 |
| 5.70 | 0.093 | 1.6 |
| 7.18 | 0.003 | 0.0 |
| 9.04 | 0.000 | 0.0 |
| 11.39 | 0.000 | 0.0 |
| 14.35 | 0.000 | 0.0 |
| 18.10 | 0.000 | 0.0 |
| 22.80 | 0.000 | 0.0 |
| median bead = | 1.48 μm | 2.75 μm |

EXAMPLE 10

The procedure of Example 8 is repeated except that the monomer mixture is homogenized at 75% of full scale using a Powerstat ® Variable Transformer. The size distribution of the beads is shown in Table 17.

TABLE 17

| Average Channel Diameter, μm | % Based on Population | % Based on Volume |
| --- | --- | --- |
| 0.71* | 0.000 | 0.0 |
| 0.90 | 20.254 | 1.7 |
| 1.13 | 17.794 | 3.3 |
| 1.42 | 19.481 | 7.0 |
| 1.80 | 19.788 | 13.6 |
| 2.26 | 11.545 | 16.6 |
| 2.84 | 6.293 | 17.8 |
| 3.58 | 3.028 | 16.7 |
| 4.52 | 1.386 | 14.9 |
| 5.70 | 0.398 | 8.4 |
| 7.18 | 0.038 | 1.1 |
| 9.04 | 0.001 | 0.0 |
| 11.39 | 0.000 | 0.0 |
| 14.35 | 0.000 | 0.0 |
| 18.10 | 0.000 | 0.0 |
| 22.80 | 0.000 | 0.0 |
| median bead = | 1.58 μm | 2.85 μm |

EXAMPLE 11

The procedure of Example 10 is repeated except that the constant temperature bath is kept at 50° C. The size distribution of the beads is shown in Table 18.

TABLE 18

| Average Channel Diameter, μm | % Based on Population | % Based on Volume |
| --- | --- | --- |
| 0.71* | 0.000 | 0.0 |
| 0.90 | 32.030 | 4.4 |
| 1.13 | 24.097 | 6.6 |
| 1.42 | 16.778 | 8.7 |
| 1.80 | 12.523 | 12.6 |
| 2.26 | 7.186 | 15.5 |
| 2.84 | 4.331 | 18.7 |
| 3.58 | 2.055 | 16.6 |
| 4.52 | 0.796 | 12.4 |
| 5.70 | 0.193 | 5.7 |
| 7.18 | 0.011 | 0.5 |
| 9.04 | 0.000 | 0.0 |
| 11.39 | 0.000 | 0.0 |
| 14.35 | 0.000 | 0.0 |
| 18.10 | 0.000 | 0.0 |
| 22.80 | 0.000 | 0.0 |
| median bead = | 1.37 μm | 2.90 μm |

We claim:

1. Discrete, substantially nonswellable, crosslinked polymeric beads having an average diameter size in the range of 0.7 to 20 μm, wherein at least 90% of the beads by population are below 20 μm, the beads being nonagglomerating in any solvent or solvents including a solvent or solvents for the monomer or monomers used in the preparation of the polymeric beads which are taken from the class consisting of homopolymers of tri- and tetraacrylate and tri- and tetramethacrylate monomers, copolymers of said tri- and tetraacrylate and tri- and tetramethacrylate monomers, copolymers of one of said tri- and tetraacrylate or said tri- and tetramethacrylate monomers and up to 25% by weight of at least one monomer having one terminal ethylenic group, copolymers of one of said tri- and tetraacrylate or said tri- and tetramethacrylate monomers and up to 50% by weight of at least one monomer having two terminal ethylenic groups or three terminal ethylenic groups different from said triacrylate or trimethacrylate monomers.

2. Polymeric beads according to claim 1 which are homopolymers of trimethylolpropane triacrylate, trimethylolpropane, trimethacrylate, pentaerythritol triacrylate, glycerol triacrylate polyoxypropyltrimethylolpropane triacrylate, polyoxyethyltrimethylolpropane triacrylate, pentaerythritol tetraacrylate, pentaaerythritol tetramethacrylate; copolymers of said monomers; copolymers of said tri- and tetraacrylate or tri- and tetramethacrylate monomers and up to 25% by weight of at least one monomer having a single terminal ethylenic group; copolymers of said tri- and tetraacrylate or tri- and tetramethacrylate monomers and up to 50% by weight of at least one monomer having two terminal ethylenic groups or three terminal ethylenic groups different from said triacrylate or trimethacrylate monomers.

3. Polymeric beads according to claim 1 which are a homopolymer of trimethylolpropane triacrylate.

4. Polymeric beads according to claim 1 which are a homopolymer of trimethylolpropane trimethacrylate.

5. Polymeric beads according to claim 1 which are a homopolymer of pentaerythritol triacrylate.

6. Polymeric beads according to claim 1 which are a homopolymer of pentaerythritol trimethacrylate.

7. Polymeric beads according to claim 1 which are a copolymer of trimethylolpropane triacrylate and up to 50% by weight of triethylene glycol diacrylate.

8. Polymeric beads according to claim 1 which are a copolymer of trimethylolpropane triacrylate and up to 50% by weight of pentaerythritol triacrylate.

9. Polymeric beads according to claim 1 wherein the average diameter sizes are in the range of about 1 to 10 μm, wherein at least 90% of the beads by population are below 10 μm.

10. Polymeric beads according to claim 1 wherein the monomer or monomers are liquid compounds.

* * * * *